United States Patent [19]

Hubbard et al.

[11] 4,243,528
[45] Jan. 6, 1981

[54] TREATER FOR MECHANICALLY BREAKING OIL AND WATER EMULSIONS OF A PRODUCTION FLUID FROM A PETROLEUM WELL

[75] Inventors: Martin G. Hubbard, Corona Del Mar; William E. Jackson, Newport Beach, both of Calif.

[73] Assignee: Kobe, Inc., Huntington Park, Calif.

[21] Appl. No.: 51,545

[22] Filed: Jun. 25, 1979

[51] Int. Cl.$^2$ .............................................. B01D 17/04
[52] U.S. Cl. .................... 210/104; 210/124; 210/195.1; 210/202; 210/DIG. 5; 166/75 R; 166/267
[58] Field of Search ........................ 210/43, 78, 83, 84, 210/73 W, 104, 124, 167, 168, 195.1, 202, 216, 259, 294, 297, 513, 540; 166/266, 267, 75 R

[56] References Cited

U.S. PATENT DOCUMENTS

| | | | |
|---|---|---|---|
| 3,709,292 | 1/1973 | Palmour | 166/68 |
| 3,764,008 | 10/1973 | Darley et al. | 210/84 |
| 3,771,654 | 11/1973 | Meissner | 210/84 |
| 3,802,501 | 4/1974 | Mecusker | 166/75 R |
| 3,817,446 | 6/1974 | Erickson | 233/2 |
| 3,982,589 | 9/1976 | Wilson et al. | 166/75 R |
| 4,036,427 | 7/1977 | Erickson | 233/21 |
| 4,064,054 | 12/1977 | Anderson | 210/DIG. 5 |

FOREIGN PATENT DOCUMENTS 5125483 3/1976 Japan ............................................ 210/78

Primary Examiner—Ernest G. Therkorn
Attorney, Agent, or Firm—Christie, Parker & Hale

[57] ABSTRACT

Production fluid from a well and emulsion breaking chemicals enter a settling vessel where much of the fluid separates into distinct levels by gravity with water at the bottom, an oil-water emulsion above the water, oil-with-emulsion above the emulsion, and gas above the oil-with-emulsion. The oil with the emulsion has two to five percent emulsion in it. The oil-with-emulsion flows over a weir into a weir box and then into the inlet of a centrifugal, pitot separator which breaks the emulsion contained in the oil by the action of a centrifugal force field to produce distinct streams of oil and water. The water feeds back into the vessel and the oil goes to storage. In the event that the emulsion feed to the separator is insufficient, the oil-with-emulsion level in the weir box falls and oil recirculates from the separator into the vessel to raise the level of oil-with-emulsion. Water leaves the vessel as required to maintain an appropriate water-emulsion interface level. The emulsion in the emulsion layer separates by gravity and the action of an emulsion breaker at a rate corresponding to the feed of emulsion into the treater.

17 Claims, 3 Drawing Figures

TREATER FOR MECHANICALLY BREAKING OIL AND WATER EMULSIONS OF A PRODUCTION FLUID FROM A PETROLEUM WELL

BACKGROUND OF THE INVENTION

The present invention relates in general to the treatment of production fluid from petroleum wells at the site of the well, and, in particular, to the breaking of an oil-water emulsion of production fluid from petroleum wells.

An oil and water emulsion in production fluids from petroleum wells is preferably broken at the well site. One method of emulsion breaking practiced in the past combined emulsion breaking chemicals, settling, heat, and an alternating electrostatic field. In this technique, production fluid containing the emulsions feeds into a separation vessel. Gas in the production fluid flows out a gas line after losing entrained condensate against baffles. The liquid, including the emulsion, initially dwells in an annular space around a fire box. Time and some heat from the fire box win some emulsion breakdown in the annular space. Free water accumulates at the bottom of the annular space and flows out through a free water conductor into a water chamber of the vessel. Emulsions above the water flow into a space on the outside of the fire box for heating the emulsions. Heated emulsion flows into a chamber beneath an emulsion spreader that spreads the emulsion out over the entire horizontal extent of an electrical coalescing section of the vessel. Rising emulsions are subjected to an alternating electrostatic field in the coalescing section and experience emulsion breaking by polarization of water molecules and a resultant coalescence of the molecules. The coalesced water drops to the bottom of the vessel into the water chamber. Water leaves the vessel through a water outlet. Oil leaves the vessel through an oil valve.

This technique of emulsion breaking requires the use of a heater. It is not desirable in many environments.

The concept of centrifugal separation of the phases of production fluid from a petroleum well is known. U.S. Pat. No. 3,982,589 to Phillip Wilson, John Erickson, Charles Nelson, and Vitolis Budrys discloses an apparatus and method for producing power fluid for production purposes. The patent states that power fluid produced from well production fluid may be used in the well to power machinery in the well. The power fluid may be pressurized at the surface by a high pressure pump and fed downhole for operating downhole machinery, for example. The fluid must be free of solid contaminates to avoid damage to the fluid handling machinery. Typically, the fluid is separated at the surface by gravity separation into water, oil, and gas phases. Usually water from the separation is used as the power fluid, although oil may be used. The Wilson et al patent discloses a phase separation vessel at the site of a petroleum well. Production fluid from the well goes into this vessel and separates into its phases by gravity. This produces the fluid that will be used as the power fluid. This fluid is withdrawn through a line and treated by a centrifugal, pitot type separator. The separator separates the fluid into a stream of dirty liquid containing undesirable solids, a stream of any entrained gas, and a stream of desired power fluid. The power fluid is then fed into the high pressure pump and from there into a well.

Many types of pitot separators are known. One is described in U.S. Pat. No. 3,817,446 to J. W. Erickson et al. Another is described in U.S. Pat. No. 4,036,427 to J. W. Erickson et al.

Schemes using cyclone separators also are being used to condition production fluid. Difficulties with the cyclone separation include the sensitivity of the separators to fluid flow rate and operating pressure. Examples of the use of such separators are described in U.S. Pat. No. 3,709,292 to Palmour and U.S. Pat. No. 3,802,501 to Mecusker.

SUMMARY OF THE INVENTION

The present invention provides a largely mechanical treater of a settling vessel and centrifugal separator for breaking the emulsion of oil and water in the production fluid from a petroleum well. The present invention relies upon gravity separation, time, emulsion breaking chemicals, and a centrifugal separation to effect emulsion breakage.

A specific form of the present invention contemplates feeding production fluid from a petroleum well thoroughly mixed with emulsion breaking chemicals into a settling vessel. The production fluid contains free water and oil. This water and oil separates immediately, with the water occupying a bottom zone in the vessel and the oil occupying a zone above the water. Emulsion occupies a zone between the oil and the water. The oil itself contains emulsion, typically from about two to about five percent emulsion. Accordingly, this zone will often be referred to as the oil-with-emulsion zone. The capacity of the vessel is such that the residence time of fluid in the vessel is high. As the emulsion breaks down, the products of the breakdown, oil and water, will move into their respective zones. The oil-with-emulsion provides a feed to a separator that mechanically breaks the entrained emulsion by subjecting it to a high centrifugal force field. The emulsion constituents of water and oil are drawn off from the centrifugal separator in separate streams, as in lines.

Preferably, the oil-with-emulsion feeds to the centrifugal separator over a weir edge of a weir box. A flow control in the weir box senses whether the oil-with-emulsion flowing into the box is sufficiently high for the feed requirements of the centrifugal separator. If it is not, discharge from the separator, preferably oil, is diverted back into the vessel so as to raise the oil-with-emulsion in the vessel and reestablish flow into the weir box. If the flow of oil-with-emulsion into the weir box is sufficient for the input requirements of the centrifugal separator, the oil from the separator goes to a storage battery or a pipeline. Preferably, discharge water from the centrifugal separator feeds back into the vessel. Water draws off of the vessel in response to a signal from a level control to maintain a desired level of water in the vessel. Preferably, the centrifugal separator is a pitot separator because this type of separator provides a substantial centrifugal force field.

These and other features, aspects and advantages of the present invention will become more apparent from the following description and appended claims.

DESCRIPTION OF THE PREFERRED EMBODIMENT

Figure 1:
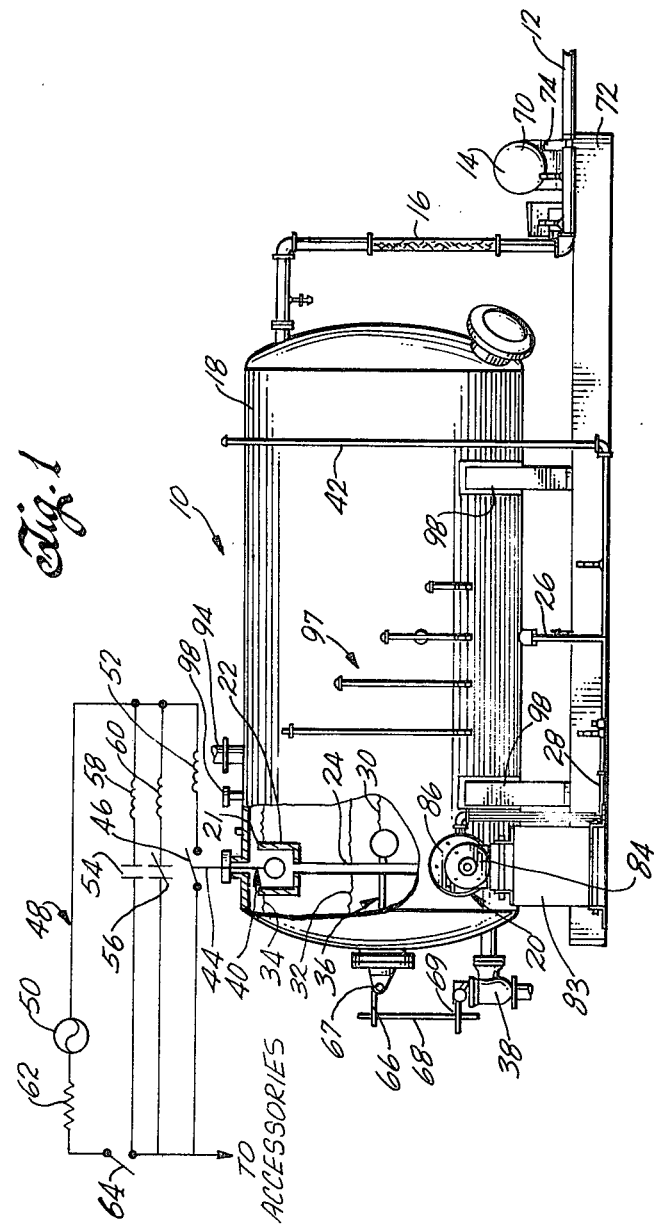
FIG. 1 is a simplified, somewhat schematic view in side elevation, with a portion broken away, of a settling vessel and centrifugal separator in accordance with the preferred embodiment of the present invention.

This description will proceed with general reference to all of the Figures. The Figures show a treater 10 for separating production fluid into its phases and for breaking down an oil-water emulsion contained within the production fluid. The production fluid enters treater 10 through a line 12. Line 12 comes from a petroleum well. A chemical feeder 14 has a line that tees into line 12 to supply emulsion breaking chemicals to production fluid flowing through the line. The chemical feeder is of standard construction and operation. A mixer 16 in the line mixes the emulsion breaking chemical with the production fluid prior to the entrance of the production fluid into a settling vessel 18. Settling vessel 18 has a capacity sufficient to give a comparatively long residence time for the fluid in it. This time separates the fluid into its phases of water, emulsion, oil-with-emulsion, and gas. Generally, much of the production fluid is not in emulsion form. The total emulsion in the production fluid may be from three to five percent. Typically, the emulsion in the oil-with-emulsion constitutes only two to five percent of the oil-with-emulsion. The phase separation that takes place in settling vessel 18 therefore, is dominated by simple, gravity forced separation. Because of the residence time within vessel 18 and the emulsion breaker, some of the emulsions of the fluid in line 12 will break down into its constituents of oil and water. But, this treatment is usually not sufficient to completely break the emulsion.

A centrifugal separator completes the task. Oil-with-emulsion enters a centrifugal, pitot type separator 20 by overflowing over a weir edge 21 into a weir box 22, and then flowing into an inlet line 24 that exits from the weir box. Line 24 goes to the inlet of separator 20. Separator 20 breaks the emulsion, and discharges its constituents of oil and water out through a water outlet line 26 and an oil outlet line 28. In the usual case, oil outlet line 28 leads to storage or a pipeline. Water reenters separation vessel 18 to establish the proper water level within the vessel.

The levels within the vessel are indicated in the broken-way portion of FIG. 1. A water-emulsion interface 30 separates emulsion above and water below the interface. An (1) interface 32 separates the two phases of emulsion and (2) oil-with-emulsion from each other. An oil-with-emulsion and gas interface 34 marks the boundary of oil-with-emulsion and gas. The oil-with-emulsion has from about two to about five percent emulsion in it. The vessel, then, has vertically spaced zones for the different phases of the production fluid.

It is important that weir box 22 receive an adequate supply of oil-with-emulsion to satisfy the flow rate requirements of centrifugal separator 20. The weir box itself functions as a reservoir to compensate for variations in the oil-with-emulsion flow rate into settling vessel 18. The position of the oil-with-emulsion relative to the weir edge of the weir box depends on the quantity of oil-with-emulsion, oil and water below the edge. The water outlet of separator 20 feeds the separator with all of the water from the incoming production fluid stream flowing through line 12. A float control 36 sensitive to the water level and the bouyancy afforded by water controls a water dump valve 38. When water level 30 becomes too high, float 36 rises and dump valve 38 opens.

A weir box oil with emulsion level float control 40 senses the level of oil-with-emulsion in weir box 22. When the level becomes too low, oil diverts from line 28 through line 42 and back into settling vessel 18. This augments any water entering the vessel through line 26 and raises the level of the oil-with-emulsion so that it overflows weir edge 21 at the top of the weir box and provides a satisfactory volume of oil-with-emulsion for the flow rate needs of separator 20.

Thus, production fluid enters settling vessel 18 through line 12. The fluid is provided with emulsion breaking chemicals from feeder 14. The vessel gives those chemicals time to break the emulsion and also permits emulsion breakdown by the mere passage of time. Oil-with-emulsion also passes into separator 20 which breaks down the emulsion by action of the centrifugal field of the separator and forms two discharge streams constituted of oil and water. In the event that the level of water in the vessel becomes too high, a control opens a water dump valve to reduce the level of water in the vessel. In the event that the free surface of the oil-with-emulsion becomes too low, oil recirculates from the centrifugal separator into the separation vessel to raise the emulsion level.

The control to initiate oil reintroduction into the vessel may take many forms. In the form illustrated, float control 40 has a rod that controls a switch 46 of a control circuit 48. Switch 46 is in a series circuit between a source of power 50 and a relay 52. Relay 52 is in series circuit with the ground of the power source. A set of contacts 54 and 56 of relay 52 control the solenoids of valves 58 and 60 respectively (the valves themselves being shown in FIGS. 2 and 3). Contacts 54 are normally open. Contacts 56 are normally closed. Valve 58 is normally open. Valve 60 is normally closed. Valve 60 is in line 28 downstream from the junction of line 42 into line 28. Valve 58 is in line 42. With the valves in their normal state, oil goes to storage and no oil recirculates back into the vessel. When switch 46 closes because of insufficient oil-with-emulsion in weir box 22, the circuit to the coil of relay 52 is made. With the making of that circuit, contacts 54 close and contacts 56 open. With the closing of contacts 54, valve 58 opens. With the opening of contacts 56, valve 58 closes. Oil then flows through branch line 42 into settling vessel 18. Oil no longer flows to oil storage. Circuit 48 includes a load 62 and an on-off switch 64. The circuit also powers accessories such as pump motors.

As seen in the first Figure, float control 36 includes an arm 66 extending from the float within settling vessel 18 to outside the vessel. A fulcrum 67 pivotally supports the arm on the settling vessel. Arm 66 pivotally attaches to a vertical shaft 68 that in turn pivotally attaches to an arm 69 of valve 38. Arm 69 in a raised position opens the flow control element of valve 38 to dump water.

Figure 2:
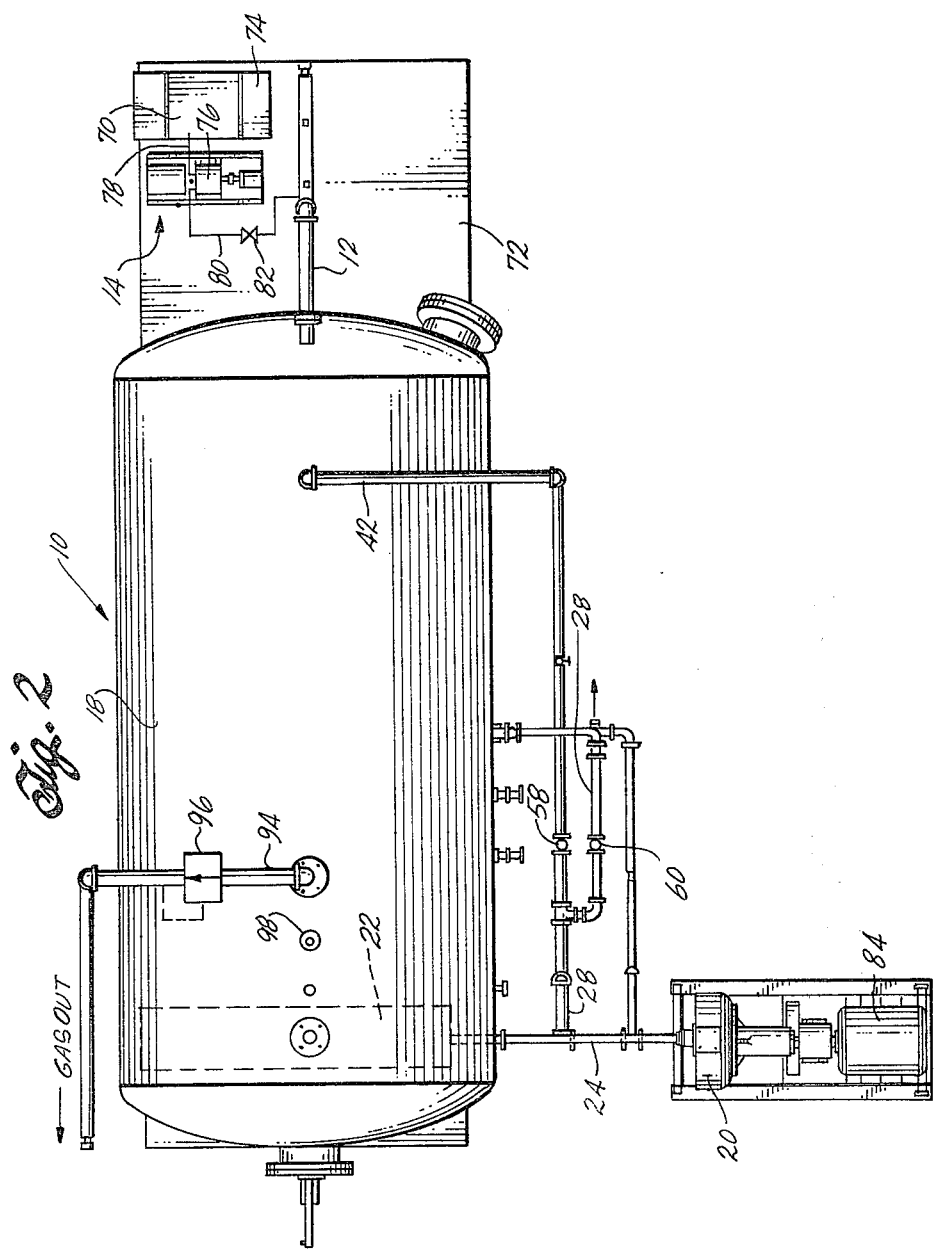
FIG. 2 is a plan view of the system shown in FIG. 1.
Figure 3:
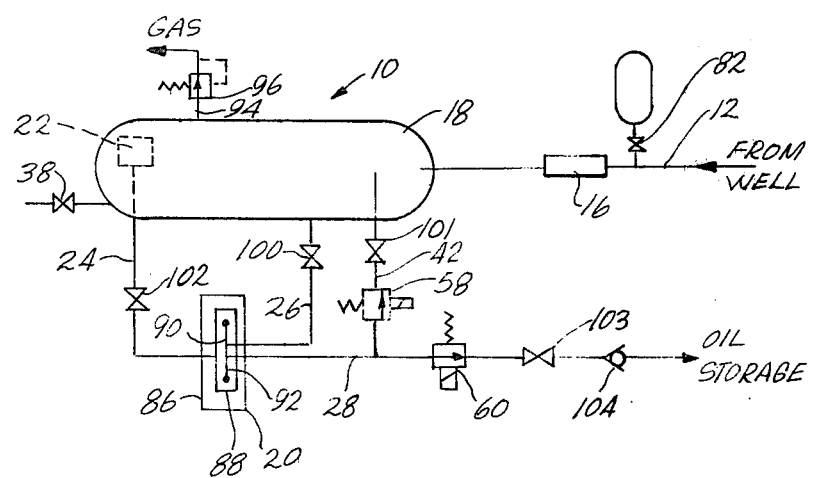
FIG. 3 is a line schematic of the treater shown in FIGS. 1 and 2.

As seen best in FIG. 2, chemical feeder 14 includes a tank 70 for storage of the emulsion breaking chemical. The tank mounts above a base 72 of the treater in a cradle 74. A pump 76 pumps the chemical from storage 70. The chemical reaches the pump through a stub line 78 and leaves the pump through a discharge line 80. Line 80 tees into line 12. A manual on-off control valve 82 in line 80 determines chemical flow. The motor of pump 76 is an accessory powered from current source 50.

Centrifugal separator 20 mounts on a pedestal 83 that in turn mounts to one side of base 72. Separator 20 includes a drive motor 84. The separator is preferably of the pitot tube type, such as described in U.S. Pat. No. 4,036,427 to Erickson et al, or it may have two pitot take-offs. Briefly, and with reference to FIG. 3, the pitot pump includes a casing 86 that houses a rotor 88. The rotor is driven by motor 84 (seen in FIGS. 1 and 2) in rotation about an axis. A stationary pitot tube 90 within the rotor has an inlet positioned to intercept water phase liquid within rotor 88 and discharge that water phase out through discharge line 26. A second pitot tube 92, again within rotor 88, intercepts oil phase liquid and discharges it out through line 28.

Alternately, the water phase can go out the wall of the rotor and collect in casing 86, and water line 26 can emanate from the casing. In this case, the casing will be maintained pressure-tight so as to maintain the head of water generated by the centrifugal pump for its reintroduction into settling vessel 18.

Gas in the space above the oil-emulsion surface leaves separator vessel 18 through a gas discharge line 94. A back pressure control valve 96 within the line is normally open, but in the event of excessive gas discharge pressure the valve closes to close the line to gas flow.

A relief valve 98 into the interior of settling vessel 18 vents the pressure within that vessel before the pressure reaches too high a level.

Incidental features of the present invention include the use of a bank of sight gauges 97 to determine the relative levels of the fluids within separation vessel 18. Vessel 18 mounts above base 72 in fore-and-aft cradles 98 and 99. Manual on-off control valves 100 and 101 in line 26 and line 42 permit isolation of the discharge of centrifugal separator 20 from vessel 18. A similar valve 102 permits isolation from the input side. Line 28 also has an on-off manual valve 103 downstream of solenoid valve 60 to control the flow of fluid from line 28 to oil storage if the need should arise. A check valve 104 prevents backflow of oil in line 28.

The present invention has been described with reference to a certain preferred embodiment. The spirit and scope of the appended claims should not, however, be limited to the foregoing description.

What is claimed is:

1. An improved on-site treater for breaking oil-water emulsions of a petroleum well comprising:
   (a) a settling vessel;
   (b) means to introduce production fluid from the well into the settling vessel;
   (c) a source of chemical emulsion breakers;
   (d) means to introduce chemical emulsion breakers from the source into the production fluid;
   (e) the vessel being of sufficient size to permit phase separation of the production fluid into at least water, an oil-water emulsion, and oil with oil and water emulsion, in progressive order from the bottom towards the top of the vessel, the vessel having a zone for each of the phases, the vessel also permitting breaking of emulsion therein by the chemicals and time;
   (f) centrifugal separator means for breaking the emulsion of the oil-with-emulsion into oil and water by centrifugal force;
   (g) means to introduce the oil-with-emulsion from the oil with oil and water emulsion zone of the settling vessel into the centrifugal separator means; and
   (h) the centrifugal separator means having means to produce respective discharge streams of oil and water from the emulsion broken in such separator means.

2. The improvement claimed in claim 1 including:
   (a) means to sense the level of the oil-with-emulsion phase in the settling vessel; and
   (b) means responsive to a predetermined low level of the oil-with-emulsion in the settling vessel to introduce discharge oil from the centrifugal separator means back into the settling vessel.

3. The improvement claimed in claim 2 wherein the oil-with-emulsion phase level sensing means includes a weir box having a weir edge, the weir box being in fluid series circuit between the oil-with-emulsion phase zone and the inlet of the centrifugal separator means and disposed within the settling vessel, the position of the weir box in the settling vessel being such as to permit oil-with-emulsion to flow from the vessel into the weir box over the weir edge, the weir box also being included in the oil-with-emulsion phase introduction means to the centrifugal separator means, the means responsive to a predetermined low level of oil-with-emulsion in the settling vessel doing so by sensing the level of oil-with-emulsion in the weir box.

4. The improvement claimed in claim 3 wherein the level sensing means includes a float switch that senses the predetermined low level of oil-with-emulsion in the weir box.

5. The improvement claimed in claim 3 wherein the centrifugal separator means includes a pitot tube separator.

6. The improvement claimed in claim 2 wherein the water stream from the centrifugal separator means discharges back into the settling vessel, and including means to withdraw water from the settling vessel upon the water reaching a predetermined excessive level within the vessel.

7. The improvement claimed in claim 6 wherein the oil-with-emulsion phase level sensing means and the oil-with-emulsion phase introduction means include a weir box having a weir edge in the settling vessel and in the oil-with-emulsion phase zone for passing oil-with-emulsion phase into the weir box, the weir box being in fluid circuit between the oil-with-emulsion phase and the centrifugal separator.

8. The improvement claimed in claim 7 wherein the level sensing means includes a float switch that senses the predetermined low level of oil-with-emulsion in the weir box.

9. The improvement claimed in claim 7 wherein the centrifugal separator means includes a pitot tube separator.

10. An improvement in the apparatus for breaking the emulsion of oil and water in a production fluid stream from an oil well, the production fluid stream having a water phase, a phase of an oil-water emulsion, and an oil with oil and water emulsion phase, the improvement comprising:
    (a) a settling vessel;
    (b) means to introduce production fluid into the settling vessel;
    (c) means to introduce a chemical emulsion breaker into the production fluid;
    (d) the settling vessel being of sufficient capacity to stratify the phases of the production fluid in accordance with their density from the bottom towards the top of the vessel in the order of water, oil-water emulsion, and oil with oil and water emulsion;

(e) a weir box within the settling vessel and having a weir edge disposed to permit oil-with-emulsion to flow into the box over the edge;

(f) a centrifugal separator in fluid series circuit with the interior of the weir box, the centrifugal separator including means to centrifugally separate the oil with water emulsion into separate oil and water streams;

(g) means for introducing the water stream from the centrifugal separator into the settling vessel;

(h) control means responding to the level of oil-with-emulsion in the weir box such that upon a predetermined small quantity of oil-with-emulsion in the weir box the control means diverts oil from the oil stream exiting the centrifugal separator back into the settling vessel; and (i) water level control means to remove water from the settling vessel upon the water reaching a predetermined excessive level.

11. The improvement claimed in claim 10 wherein the centrifugal separator is of the pitot tube type and includes a rotor within a casing and a pitot tube within the rotor, the pitot tube being positioned to draw off either the water or oil of the separated oil and water.

12. The improvement claimed in claim 11 wherein the weir box control means includes float means to sense the level of fluid in the weir box.

13. The improvement claimed in claim 12 wherein the water level control means includes a float control operable to discharge water from the vessel upon the occurrence of a predetermined excessive amount of water therein.

14. The improvement claimed in claim 13 wherein the chemical emulsion breaker introduction means introduces chemical emulsion breaker into the production fluid stream upstream of the settling vessel.

15. The improvement claimed in claim 10 wherein the water level control means includes a float control operable to discharge water from the vessel upon the occurrence of a predetermined excessive amount of water therein.

16. The improvement claimed in claim 15 wherein the centrifugal separator is of the pitot tube type that includes a rotor within a casing and a pitot tube within the rotor, the pitot tube being positioned to draw off either the water or oil of the separated oil and water.

17. The improvement claimed in claim 16 wherein the weir box control means includes float means to sense the level of fluid in the weir box.

* * * * *